(12) United States Patent
Ueda (10) Patent No.: US 7,649,285 B2
(45) Date of Patent: Jan. 19, 2010

(54) LINEAR DRIVE DEVICE

(75) Inventor: Kazuhiko Ueda, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 154 days.

(21) Appl. No.: 11/909,958

(22) PCT Filed: Feb. 27, 2006

(86) PCT No.: PCT/JP2006/303546
§ 371 (c)(1),
(2), (4) Date: Sep. 27, 2007

(87) PCT Pub. No.: WO2006/112150
PCT Pub. Date: Oct. 26, 2006

(65) Prior Publication Data
US 2009/0079276 A1 Mar. 26, 2009

(30) Foreign Application Priority Data
Mar. 30, 2005 (JP) .............................. 2005-097464

(51) Int. Cl.
*H02K 1/34* (2006.01)
*H02K 33/02* (2006.01)
(52) U.S. Cl. .............................. 310/12.01; 310/156.12; 310/156.13; 310/156.26; 310/156.28
(58) Field of Classification Search ............ 310/156.12, 310/156.13, 156.23, 156.26, 156.28, 156.38, 310/156.07, 12–15, 43; 417/417
See application file for complete search history.

(56) References Cited
U.S. PATENT DOCUMENTS
6,097,125 A * 8/2000 Park et al. ............... 310/156.45

| | | | |
|---|---|---|---|
| 6,886,348 B2 * | 5/2005 | Ogura ............................. | 62/6 |
| 6,920,682 B2 * | 7/2005 | Ku et al. ....................... | 29/596 |
| 7,122,919 B2 * | 10/2006 | Maezawa et al. .............. | 310/14 |
| 2002/0033647 A1 * | 3/2002 | Uemura et al. ......... | 310/156.12 |
| 2004/0093873 A1 | 5/2004 | Ogura | |
| 2004/0189105 A1 | 9/2004 | Maezawa et al. | |

FOREIGN PATENT DOCUMENTS

| | | |
|---|---|---|
| JP | 1-107646 A | 4/1989 |
| JP | 2001-57767 A | 2/2001 |
| JP | 2004-297850 A | 10/2004 |
| JP | 2004-297858 A | 10/2004 |
| JP | 2002-34224 A | 1/2005 |
| JP | 2005-20808 A | 1/2005 |
| KR | 2003-0042041 A | 5/2003 |

* cited by examiner

*Primary Examiner*—Quyen Leung
*Assistant Examiner*—Leda Pham
(74) *Attorney, Agent, or Firm*—Birch, Stewart, Kolasch & Birch, LLP (57) ABSTRACT

A cup-shaped sleeve is made mainly of a resin and has an end where a plurality of pieces of a permanent magnet are insert-molded. An auxiliary ring made mainly of a resin is provided along an inner peripheral surface of the cup-shaped sleeve other than an inner peripheral surface thereof where the permanent magnet is provided. The auxiliary ring has its inner peripheral surface identical to the inner peripheral surface of the permanent magnet or located outside relative to the inner peripheral surface of the permanent magnet. When the cup-shaped sleeve is resin-molded, the resin which is a component of the cup-shaped sleeve is prevented from shrinking inward. Therefore, contact between the resin supporting the permanent magnet and the cylinder is prevented. Accordingly, a linear drive device is obtained in which the reciprocation of the piston is prevented from being hindered.

10 Claims, 7 Drawing Sheets

LINEAR DRIVE DEVICE

TECHNICAL FIELD

The present invention relates to a linear drive device having a piston performing a reciprocating motion.

BACKGROUND ART

For a linear compressor and a Stirling refrigerator for example, a linear drive device has conventionally been used that has a piston coupled to a magnet assembly reciprocated as a result of a change of magnetic fields generated by a linear motor.

Patent Document 1: Japanese Patent Laying-Open No. 2004-297858

DISCLOSURE OF THE INVENTION

Problems to be Solved by the Invention

In a process of manufacturing a linear drive device as described above, a permanent magnet which is a component of the magnet assembly and a resin for a cup-shaped sleeve are coupled by insert molding. In the insert molding process, the shrinkage of the permanent magnet and that of the resin are different from each other. Specifically, when the insert molding is performed, the permanent magnet hardly shrinks while the resin shrinks to a large extent. Because of this, the inner peripheral surface of the resin which is a component of the cup-shaped sleeve supporting the permanent magnet is located inward relative to the inner peripheral surface of the permanent magnet. In this case, when the magnet assembly reciprocates together with the piston, an inner yoke and the inner peripheral surface of the resin which is a component of the cup-shaped sleeve could be brought into contact with each other. As a result, the reciprocating motion of the piston could be hindered.

Further, in the case where the permanent magnet of the magnet assembly includes a plurality of magnet pieces arranged in the circumferential direction, if the resin does not readily flow into a space between magnet pieces, a void is generated in the resin at this portion. As a result, the magnet piece could be detached from the resin to cause the reciprocating motion of the piston to be hindered.

Furthermore, in the case where the inner peripheral surface of the permanent magnet contacts the inner yoke while the piston is driven, the reciprocating motion of the piston could be hindered. If the whole cup-shaped sleeve is made larger on the outer peripheral side in order to prevent this, the outer peripheral surface of the cup-shaped sleeve contacts another component to hinder the reciprocating motion of the piston. In addition, a linear motor in which the cup-shaped sleeve is incorporated accordingly has a larger diameter or the distance between the inner yoke and an outer yoke accordingly increases to cause motor performance to deteriorate.

The present invention has been made in view of the above-described problems, and an object of the invention is to provide a compact linear drive device in which the reciprocating motion of the piston is hardly hindered.

Means for Solving the Problems

According to an aspect of the present invention, a linear drive device includes a cylinder, a piston reciprocating in the cylinder and a linear motor provided outside the cylinder and reciprocating the piston. The linear drive device further includes a cup-shaped sleeve mainly made of a resin, coupled to the piston and functioning as a movable element of the linear motor. The linear drive device further includes a permanent magnet molded integrally with an inner peripheral surface on an open end side of the cup-shaped sleeve and reciprocated by a magnetic field generated by the linear motor. A ring-shaped member having its inner peripheral surface identical or larger in diameter than the inner peripheral surface of the permanent magnet is provided at an inner peripheral surface of the cup-shaped sleeve other than the inner peripheral surface thereof where the permanent magnet is provided.

With the above-described configuration, the ring-shaped member prevents, in a process of resin-molding the cup-shaped sleeve, shrinkage of the portion of the inner peripheral surface of the cup-shaped sleeve where the permanent magnet is not provided. Therefore, it is prevented that the cup-shaped sleeve is shaped having a cylindrical portion smaller in inner diameter than the inner peripheral surface of the permanent magnet. Accordingly, while the piston is reciprocating, contact of the inner peripheral surface of the cylindrical portion with the outer peripheral surface of the inner yoke is prevented. In other words, the piston's reciprocation is prevented from being hindered.

According to another aspect of the present invention, a linear drive device includes a cylinder, a piston reciprocating in the cylinder and a linear motor provided outside the cylinder and reciprocating the piston. The linear drive device further includes a cup-shaped sleeve made of a resin, coupled to the piston and functioning as a movable element of the linear motor. The linear drive device further includes a permanent magnet molded integrally with an inner peripheral surface on an open end side of the cup-shaped sleeve and reciprocated by a magnetic field generated by the linear motor. The permanent magnet includes a plurality of magnet pieces arranged in a circumferential direction, and a distance between the plurality of magnet pieces is larger at an outer side than at an inner side.

With the above-described configuration, flow is facilitated of the resin into the space between the magnet pieces in an insert molding process of the magnet pieces. Thus, a void of the cup-shaped sleeve is prevented from being generated in the space between the magnet pieces. Accordingly, the magnet piece is prevented from being detached from the resin. Accordingly, the piston's reciprocation is prevented from being hindered.

According to still another aspect of the present invention, a linear drive device includes a cylinder, a piston reciprocating in the cylinder and a linear motor provided outside the cylinder and reciprocating the piston. The linear drive device further includes a cup-shaped sleeve made of a resin, coupled to the piston and functioning as a movable element of the linear motor. The linear drive device further includes a permanent magnet molded integrally with an inner peripheral surface on an open end side of the cup-shaped sleeve and reciprocated by a magnetic field generated by the linear motor. The permanent magnet has its surface that is surface-treated so that a friction coefficient is reduced.

With the above-described configuration, while the magnet is insert-molded with a resin material, the frictional force occurring between the permanent magnet and the resin is reduced. Therefore, the flow of the resin is improved and the thickness of the resin provided outside the permanent magnet can be reduced. Since the possibility of contact between the outer peripheral surface of the piston and the outer yoke can be lowered and thus the piston's reciprocation is prevented from being hindered. Further, the distance between the inner yoke and the outer yoke can be reduced and thus linear motor characteristics can be improved.

According to a further aspect of the present invention, a linear drive device includes a cylinder, a piston reciprocating in the cylinder and a linear motor provided outside the cylinder and reciprocating the piston. The linear drive device further includes a cup-shaped sleeve made of a resin, coupled to the piston and functioning as a movable element of the linear motor. The linear drive device further includes a permanent magnet molded integrally with an inner peripheral surface on an open end side of the cup-shaped sleeve and reciprocated by a magnetic field generated by the linear motor. At an inner peripheral surface of the cup-shaped sleeve, a ring-shaped member is provided that is made of a resin and covers an inner peripheral surface of the permanent magnet.

With the above-described configuration, since the inner peripheral surface of the permanent magnet is covered with the ring-shaped member, the inner peripheral surface of the permanent magnet is prevented from being damaged. Further, if the thickness of the ring member is substantially identical in the axial direction, the ring-shaped member can be produced by extrusion and the parts cost can be reduced.

Effects of the Invention

In accordance with the present invention, a compact linear drive device can be obtained in which the reciprocating motion of the piston is hardly hindered.

The foregoing and other objects, features, aspects and advantages of the present invention will become more apparent from the following detailed description of the present invention when taken in conjunction with the accompanying drawings.

DESCRIPTION OF THE REFERENCE SIGNS 1 piston, 3 cylinder, 14 cup-shaped sleeve, 15 permanent magnet, 50, 51, 52 auxiliary ring

BEST MODES FOR CARRYING OUT THE INVENTION

First Embodiment

In the following, with reference to FIG. 1, a Stirling refrigerator which is an example of the linear drive device in an embodiment of the present invention will be described.

Figure 1:
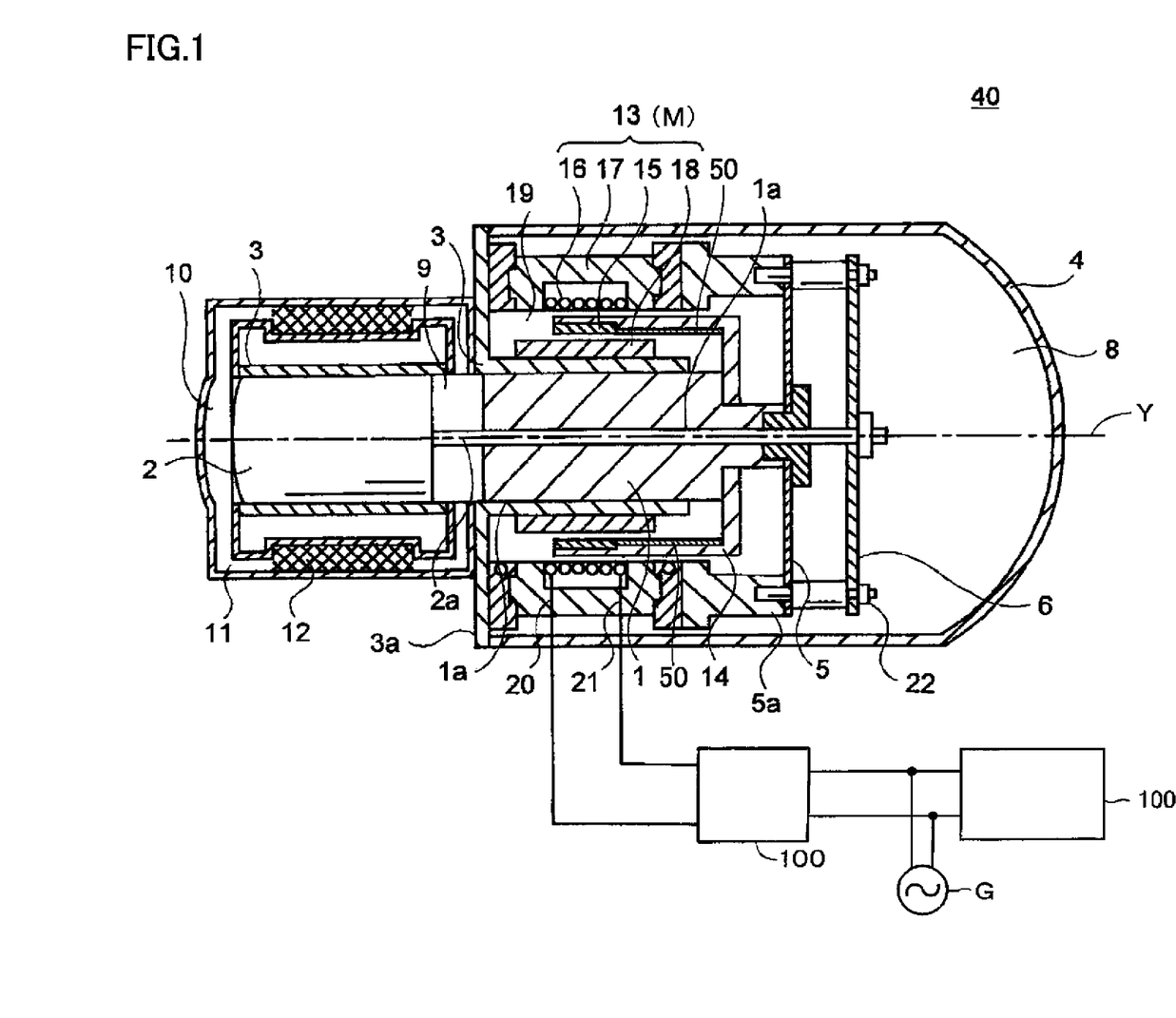
FIG. 1 is a cross section showing a configuration of a Stirling refrigerator in a first embodiment.

FIG. 1 is a cross section showing Stirling refrigerator 40 in the embodiment. Stirling refrigerator 40 has a cylinder 3 in the shape of a hollow cylinder composed of two sections, and a piston 1 and a displacer 2 that are in the shape of a solid cylinder are fit in the cylinder. Piston 1 and displacer 2 are provided with a compression space 9 therebetween and have a common drive axis, namely axis Y.

On the front end side of displacer 2, an expansion space 10 is formed. Compression space 9 and expansion space 10 communicate with each other through a medium flow path 11 where an operation medium such as helium flows. In medium flow path 11, a regenerator 12 is provided. Regenerator 12 stores heat of the operation medium and supplies the stored heat to the operation medium. At a substantially central portion of cylinder 3, a collar (flange) 3a is provided. To collar 3a, a dome-shaped pressure-proof vessel 4 is attached to form an airtight bounce space (back space) 8.

On the rear end side, piston 1 is integrated with a support spring 5. Displacer 2 is integrated with a support spring 6 via a rod 2a extending through a central hole 1a of piston 1. Support spring 5 and support spring 6 are coupled by a bolt and a nut 22. As described hereinlater, as piston 1 is reciprocated, displacer 2 is reciprocated with a predetermined phase difference with respect to piston 1, because of a change of the pressure of the operation fluid occurring between piston 1 and displacer 2.

An inner yoke 18 is fit on the outside of cylinder 3 in bounce space 8. Inner yoke 13 is opposite to an outer yoke 17 with a gap 19 there between. A drive coil 16 is fit on the inside of outer yoke 17. In gap 19, an annular permanent magnet 15 is movably provided. Permanent magnet 15 is integrated with piston 1 with cup-shaped sleeve 14 therebetween. Inner yoke 18, outer yoke 17, drive coil 16 and permanent magnet 15 constitute a linear motor 13 (M) moving piston 1 along axis Y.

To drive coil 16, leads 20 and 21 are connected. Leads 20 and 21 extend through the wall of pressure-proof vessel 4 to be connected to an inverter circuit 100 of an AC power generating device. A microcomputer 1000 controls inverter circuit 100 so that drive power is supplied to linear motor 13 (M).

Regarding Stirling refrigerator 40 configured as described above, as piston 1 is reciprocated by linear motor 13 (M), displacer 2 is reciprocated with a predetermined phase difference with respect to piston 1. Accordingly, the operation medium is moved between compression space 9 and expansion space 10. As a result, a reverse Stirling cycle is established.

Regarding Stirling refrigerator 40 in the embodiment as described above, inverter circuit 100 of the AC power generating device applies a drive voltage having a predetermined AC waveform to linear motor 13 (M), and accordingly piston 1 is reciprocated with cycles and strokes according to the drive voltage with the predetermined AC waveform. Therefore, by controlling the drive voltage applied to linear motor 13, the cycle and stroke of the reciprocating motion of piston 1 can be controlled.

An operational principle will be described in more detail of the free-piston-type Stirling refrigerator in the present embodiment described above.

Piston 1 is driven by linear motor 13. Piston 1 is elastically supported on support spring 5. Therefore, piston 1 moves so that the relation between its position and time is represented by a sinusoidal wave.

Further, as piston 1 moves, the operation gas in compression space 9 is moved so that the relation between its pressure and time is represented by a sinusoidal wave. The operation gas compressed in compression space 9 first releases heat from compression space 9 serving as a heat-releasing heat exchanger. Then, the compressed operation gas is cooled by regenerator 12 provided around displacer 2. After this, the compressed operation gas flows from regenerator 12 into expansion space 10 serving as a heat-absorbing heat exchanger.

The operation gas in expansion space 10 is expanded by movement of piston 1. The temperature of the expanded operation gas decreases. The operation gas in expansion space 10 moves so that the relation between its pressure and time is represented by a sinusoidal wave. The sinusoidal wave representing the relation between the pressure and time of the operation gas in expansion space 10 is a waveform having a predetermined phase difference with respect to the sinusoidal wave representing the relation between the pressure and time of the operation gas in compression space 9, and they change with the same cycles. In other words, displacer 2 reciprocates in the state of having a predetermined phase difference with respect to piston 1.

A PWM control signal that is output from microcomputer 1000 to inverter circuit 100 is a digital signal, namely a pulse waveform. The pulse waveform is converted into an analogue signal namely AC waveform, by inverter circuit 100. The frequency of the AC waveform is the frequency of piston 1 of Stirling refrigerator 40.

When a digital signal is converted into an analog signal, the PWM is used as described above. More specifically, a plurality of pulses successively output from microcomputer 1000 have the width gradually changing from a smaller one to a larger one to reach a peak width and thereafter gradually changing to a smaller one. Thus, the AC waveform is generated.

Figure 2A:
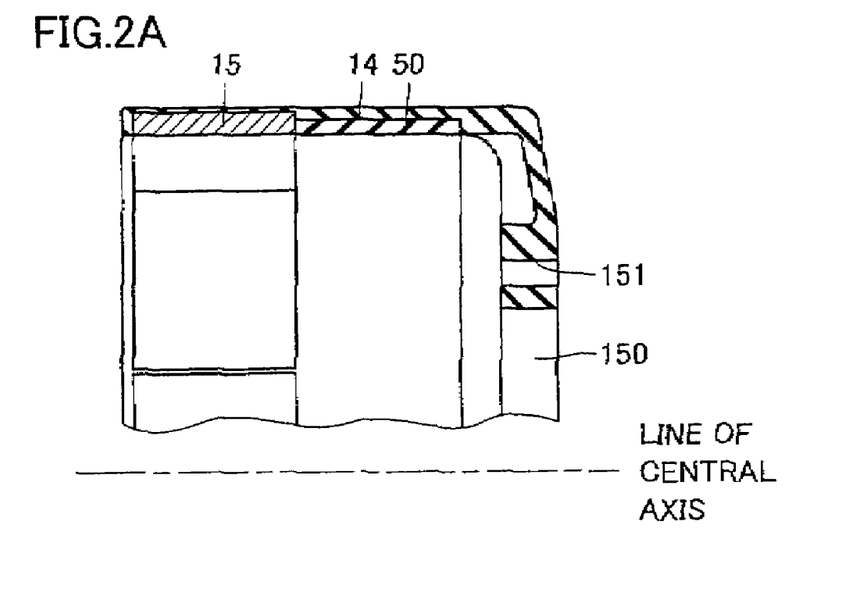
FIGS. 2A and 2B are longitudinal cross sections of a cup-shaped sleeve in the embodiment.
Figure 2B:
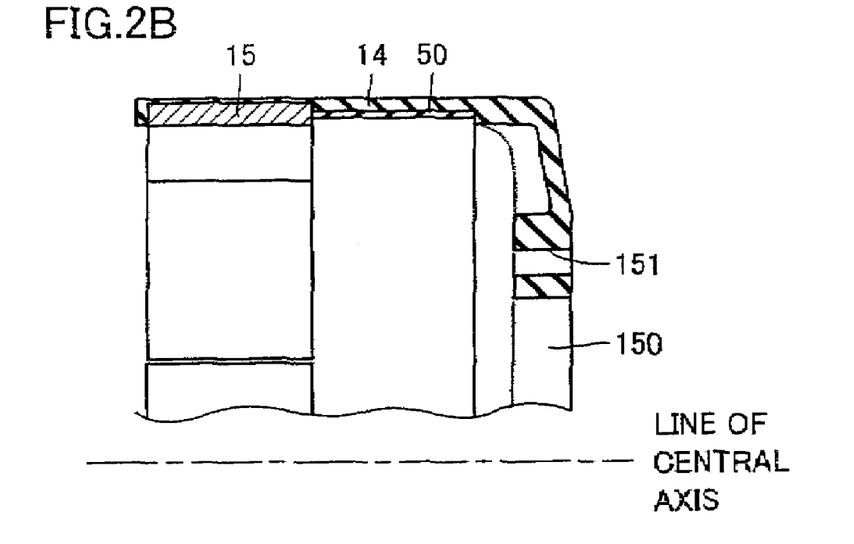
Figure 3:
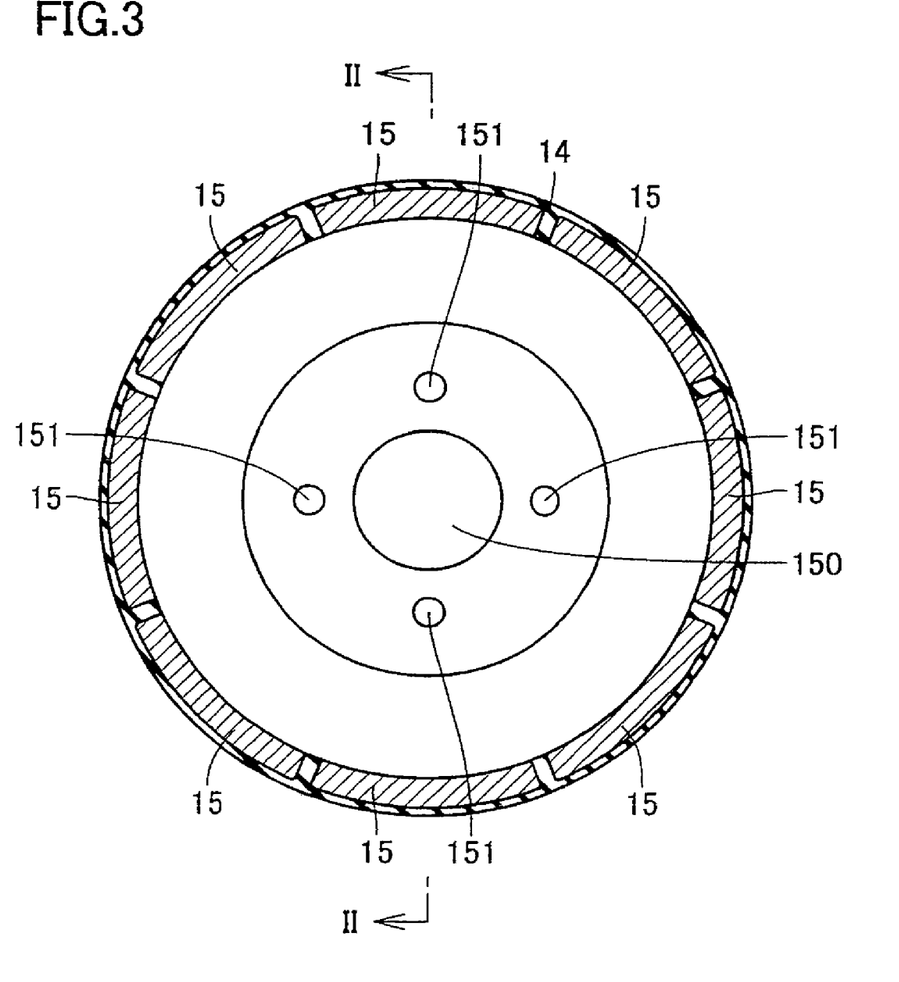
FIG. 3 is a transverse cross section of the cup-shaped sleeve in the embodiment.

In the linear drive device in the present embodiment, as shown in FIGS. 2 and 3, permanent magnet 15, cup-shaped sleeve 14 supporting permanent magnet 15 and an auxiliary ring 50 provided adjacent to permanent magnet 15 and having the same inner peripheral surface as the inner peripheral surface of permanent magnet 15 are integrated into a single unit. Here, the inner peripheral surface of auxiliary ring 50 may be located outward relative to the inner peripheral surface of permanent magnet 15. Auxiliary ring 50 is a resin mold member having a cylindrical shape provided along the inner peripheral surface of cup-shaped sleeve 14. Auxiliary ring 50 is not necessarily required to be made of a resin. As long as the weight of the ring is light, the ring may be made of a metal. As long as the resin with which cup-shaped sleeve 14 is molded does not shrink to become smaller than the inner diameter of permanent magnet 15, the ring may be made of any material.

Further, on the open end side of cup-shaped sleeve 14, permanent magnet 15 includes a plurality of magnet pieces that are disposed and insert-molded in the resin. Therefore, respective spaces between these pieces constituting permanent magnet 15 are filled with the resin that forms the open end portion of cup-shaped sleeve 14. Further, the resin portion on the open end portion of cup-shaped sleeve 14 is formed in a cylindrical shape to cover the entire outer peripheral surface of the magnet pieces. Respective surfaces of those magnet pieces as described above are nickel-plated or aluminum-coated for example, namely subjected to any treatment for reducing the friction coefficient. Therefore, there is a smaller frictional force between permanent magnet 15 and the resin flowing in the molding process. Thus, even if the thickness of the resin on the outside of permanent magnet 15 is small, the resin is allowed to flow sufficiently. Therefore, the molding can be accomplished without voids. Thus, as long as there is the same gap 19 where permanent magnet 15 moves, the possibility of contact between the outer peripheral surface of cup-shaped sleeve 14 and another component (outer yoke 17) can be reduced. As a result, the reciprocating motion of piston 1 can be prevented from being hindered. Further, the distance (gap 19) between the inner and outer yokes can be reduced and the characteristics of the linear motor can be improved.

Figure 4:
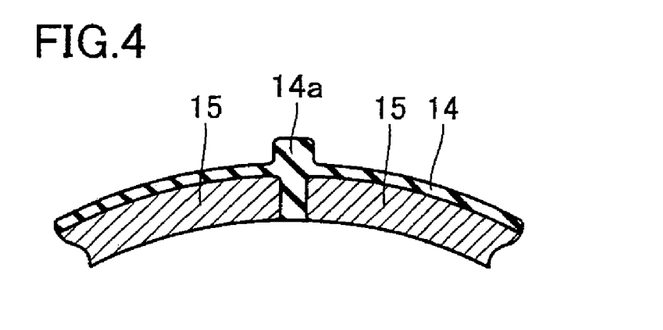
FIG. 4 is a partial transverse cross section of another example of the cup-shaped sleeve in the embodiment.

It should be noted that the open end portion of cup-shaped sleeve 14 in the present embodiment may have a projecting portion 14*a* that is located between magnet pieces constituting permanent magnet 15 and that is the resin protruding outward, as shown in FIG. 4. If a mold adapted for this shape is used, flow of the resin into the space between magnet pieces is facilitated. Therefore, a defect (void) can be prevented from being generated in the molded resin of cup-shaped sleeve 14. Accordingly, the reciprocating motion of piston 1 is prevented from being hindered by detachment of magnetic pieces from the resin while piston 1 is driven.

Figure 5:
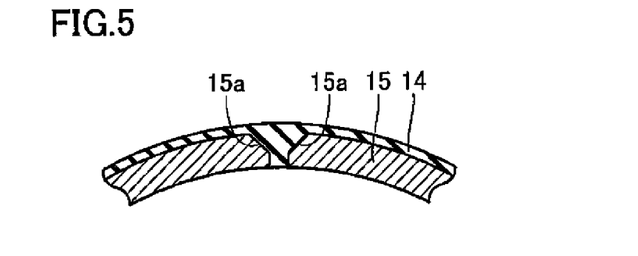
FIG. 5 is a partial transverse cross section of still another example of the cup-shaped sleeve in the embodiment.

In order to facilitate flow of the resin into the space between pieces of permanent magnet 15, it is desirable that an outer corner 15*a* of each of a plurality of pieces of permanent magnet 15 is chamfered, as shown in FIG. 5. Thus, the distance between adjacent pieces of permanent magnet 15 is larger at the radially outer side than at the radially inner side, so that flow of the resin from the radially outer side toward the radially inner side is facilitated. Further, by employing the configuration as shown in FIGS. 4 and 5, the mechanical strength of cup-shaped sleeve 14 can be improved.

Figure 6:
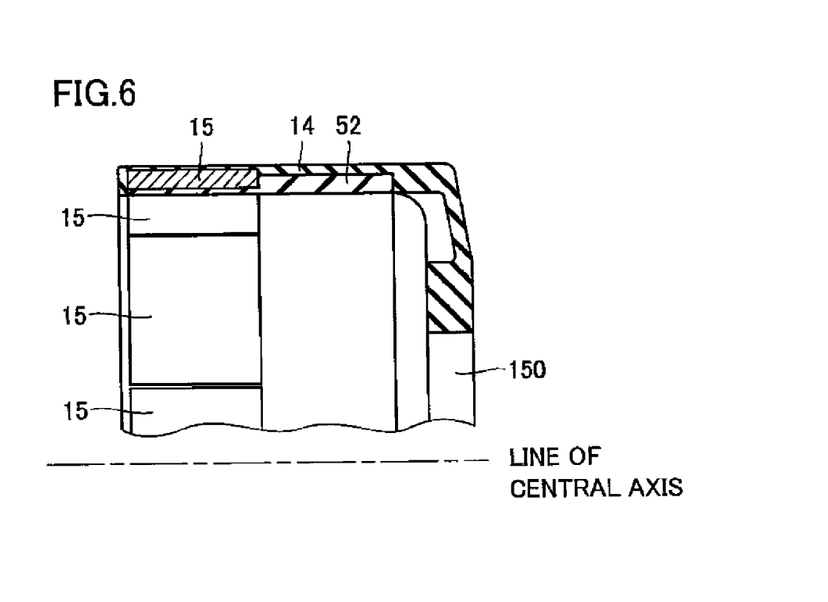
FIG. 6 is a transverse cross section of a further example of the cup-shaped sleeve in the embodiment.
Figure 7:
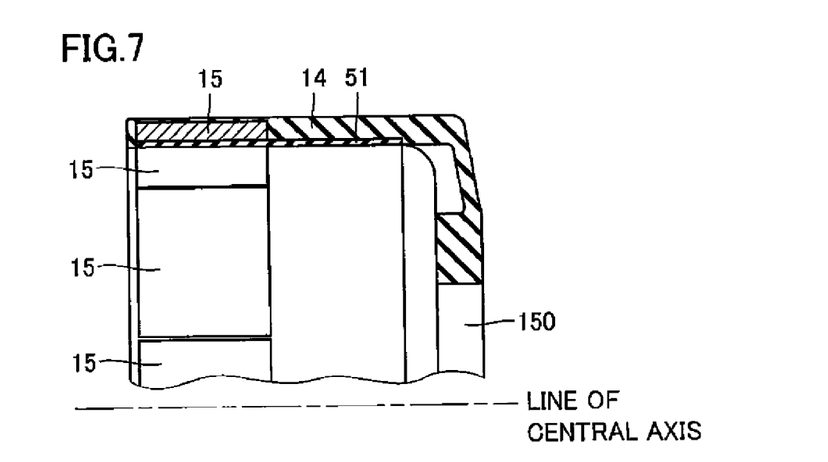
FIG. 7 is a transverse cross section of a further example of the cup-shaped sleeve in the embodiment.

As shown in FIGS. 6 and 7, auxiliary ring 50 may be configured to cover the entire inner peripheral surface of a plurality of pieces of permanent magnet 15. FIG. 6 shows a configuration having a cylindrical auxiliary ring 52 integrated to eliminate the difference in level between the inner peripheral surface of cup-shaped sleeve 14 and permanent magnet 15. FIG. 7 shows a configuration having an auxiliary ring 51 with a substantially constant thickness integrated in the drive direction of cylinder 3. When auxiliary ring 51 or 52 as shown in FIGS. 6 and 7 is used, the inner peripheral surface of permanent magnet 15 is covered with auxiliary ring 51 or 52 and therefore, the inner peripheral surface of permanent magnet 15 is prevented from being damaged. Further, when a cylindrical member having a constant thickness such as auxiliary ring 51 is used, the member can be produced by extrusion and accordingly the cost necessary for the mold and parts can be reduced.

Figure 8:
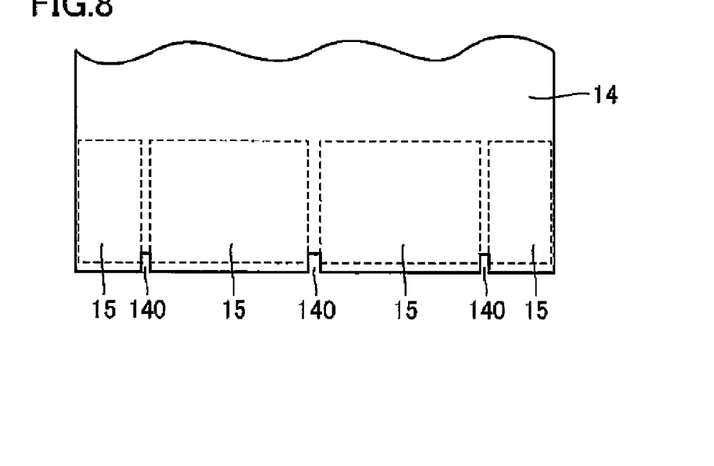
FIG. 8 is a side view illustrating a slit of the cup-shaped sleeve in the embodiment.
Figure 9:
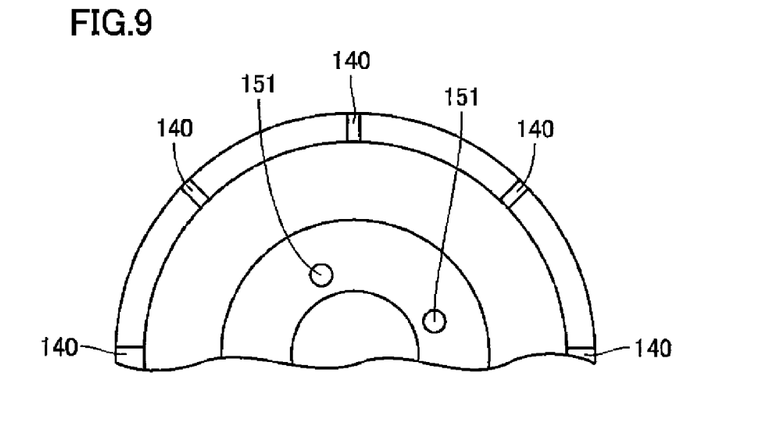
FIG. 9 is a top view illustrating a positioning slit of the cup-shaped sleeve in the embodiment.

As shown in FIGS. 8 and 9, the front end of cup-shaped sleeve 14 in the present embodiment has a slit 140 corresponding to a rib provided to the mold for positioning permanent magnet 15 when permanent magnet 15 is insert-molded in the resin. Thus, by providing a rib to the mold for positioning permanent magnet 15, positioning of permanent magnet 15 is facilitated.

Figure 10:
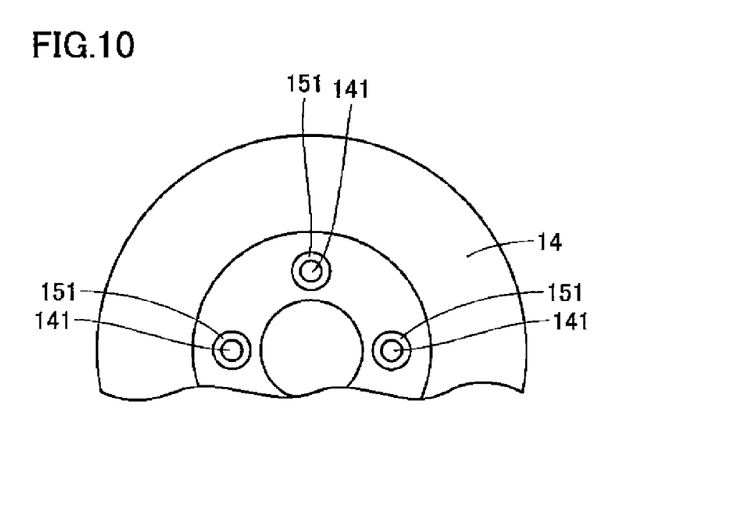
FIG. 10 is a bottom view of the cup-shaped sleeve in the embodiment.
Figure 11:
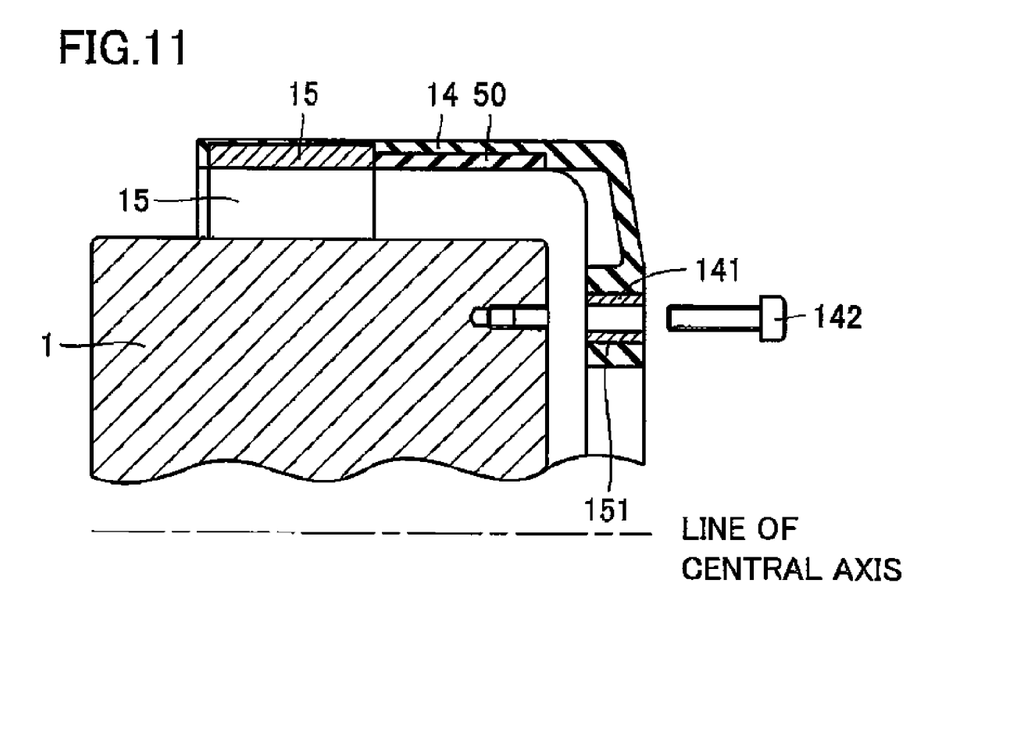
FIG. 11 illustrates a method of attaching the cup-shaped sleeve and a piston in the embodiment.
Figure 12:
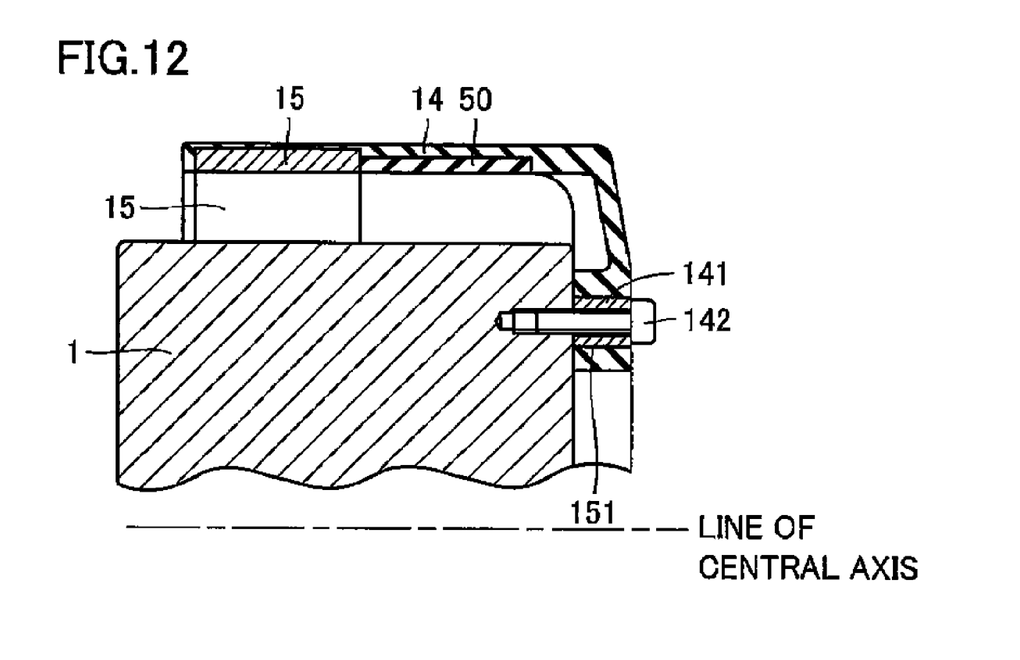
FIG. 12 illustrates a state where the cup-shaped sleeve and piston are attached in the embodiment.

Further, as shown in FIGS. 10 to 12, cup-shaped sleeve 14 and piston 1 in the present embodiment are coupled by means of an external screw 142. External screw 142 extends through a sleeve-shaped metal 141 insert-molded in the bottom surface of cup-shaped sleeve 14 to be screwed in an internal screw provided in piston 1. With this configuration, the coupling between external screw 142 and metal 141 is firm and thus positional displacement between piston 1 and cup-shaped sleeve 14 due to the reciprocating motion and secular change is prevented.

Second Embodiment

Using FIG. 13, a description will be given of a linear compressor which is another example of the linear drive device in the embodiment of the present invention.

Figure 13:
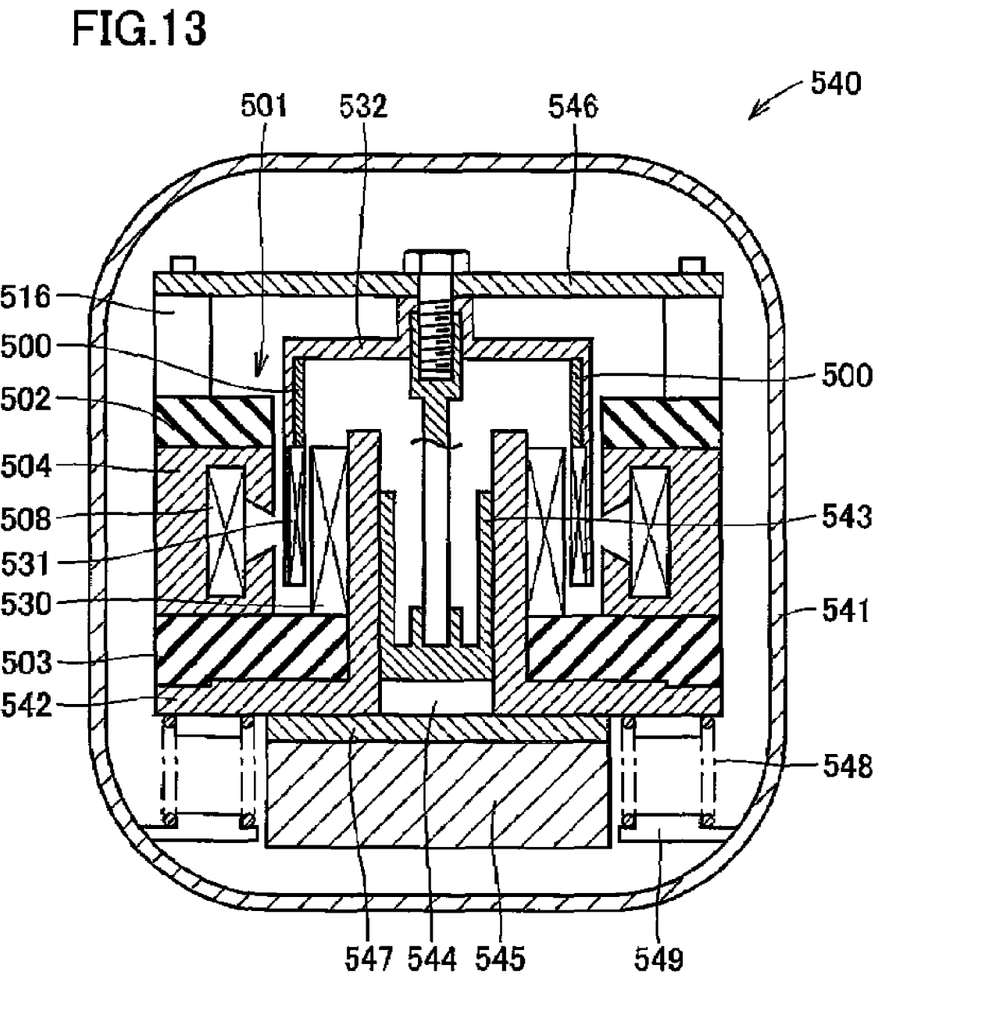
FIG. 13 is a cross section showing a configuration of a linear compressor in a second embodiment.

As shown in FIG. 13, linear compressor 540 includes a cylinder 542 disposed in a casing 541, a piston 543 reciprocating in cylinder 542, a linear motor 501 disposed in an outer peripheral region of cylinder 542 and driving piston 543, a piston spring (leaf spring) 546 biasing piston 543, and a support mechanism supporting the cylinder.

Linear motor 501 includes an inner yoke 530 disposed in an outer peripheral region of cylinder 542, an outer yoke 504 disposed outside inner yoke 530, a coil 508 and a cup-shaped sleeve 532 disposed between inner yoke 530 and outer yoke 504, first and second clamp rings 502 and 503 holding outer yoke 504 therebetween, a spacer (not shown) coupling first and second clamp rings 502 and 503 at a predetermined interval, and a support portion 516 supporting piston spring 546.

Inner yoke 530 is provided to surround the outer periphery of cylinder 542, and cup-shaped sleeve 532 having a cylindrical shape is disposed to surround inner yoke 530. Cup-shaped sleeve 532 is connected to piston 543 and has, on its end, a plurality of magnet pieces constituting a permanent magnet 531. Each of a plurality of magnet pieces is disposed between inner yoke 530 and outer yoke 504. At an inner surface portion of cup-shaped sleeve 532 where permanent magnet 531 is not provided, a cylindrical auxiliary ring 500 is provided. Auxiliary ring 500 is configured similarly to auxiliary ring 50 in the first embodiment.

First clamp ring 502 has support portion 516 supporting piston spring 546. Through a support member attached to support portion 516, piston spring 546 is connected to support portion 516.

Further, in linear compressor 540, a compression space 544 is formed by cylinder 542, piston 543 and the opposite surface (547). Cylinder 542 is supported in casing 541 by the support mechanism, and the support mechanism is constituted, in the example of FIG. 13, of a support plate 549 fixed to the inside of casing 541 and a coil spring 548 mounted on support plate 549 and supporting cylinder 542.

A head cover 545 is fixed at one end of cylinder 542 with plate 547 therebetween. In compression space 544, the refrigerant is compressed by head cover 545 and the head of piston 543.

A description will be given of operation of the linear compressor configured as described above. Coil 508 is energized first. Then, thrust is generated between the coil and permanent magnet 531 of cup-shaped sleeve 532. The thrust causes cup-shaped sleeve 532 to move in the axial direction of cylinder 542. At this time, since cup-shaped sleeve 532 is connected to piston 543, piston 543 is also moved in the axial direction of cylinder 542 together with cup-shaped sleeve 532.

The refrigerant is supplied from a suction tube (not shown) into casing 541, and passes through a path in head cover 545 and plate 547 into compression space 544. In this compression space 544, the refrigerant is compressed by piston 543 and thereafter discharged through a discharge tube (not shown) to the outside.

Cup-shaped sleeve 532 and permanent magnet 531 for example in the present embodiment are configured similarly to cup-shaped sleeve 14 and permanent magnet 15 for example of the first embodiment described in connection with FIGS. 2 to 12. Therefore, the linear drive device of the linear compressor in the present embodiment can achieve similar effects to those achieved by the linear drive device in the first embodiment.

While the present invention has been described in detail, the description is give only by way of illustration, not limitation, and it is clearly construed that the spirit and scope of the invention are limited only by the claims attached herewith.

The invention claimed is:

1. A linear drive device comprising:
a cylinder;
a piston reciprocating in said cylinder;
a linear motor provided outside said cylinder and reciprocating said piston;
a cup-shaped sleeve made of a resin, coupled to said piston and functioning as a movable element of said linear motor; and
a permanent magnet molded integrally with an inner peripheral surface on an open end side of said cup-shaped sleeve and reciprocated by a magnetic field generated by said linear motor, wherein
a ring-shaped member having its inner peripheral surface identical or larger in diameter than the inner peripheral surface of said permanent magnet is molded integrally with an inner peripheral surface of said cup-shaped sleeve other than the inner peripheral surface thereof where said permanent magnet is provided.

2. A linear drive device, comprising:
a cylinder;
a piston reciprocating in said cylinder;
a linear motor provided outside said cylinder and reciprocating said piston;
a cup-shaped sleeve made of a resin, coupled to said piston and functioning as a movable element of said linear motor; and
a permanent magnet molded integrally with an inner peripheral surface on an open end side of said cup-shaped sleeve and reciprocated by a magnetic field generated by said linear motor, wherein
said permanent magnet includes a plurality of magnet pieces arranged in a circumferential direction, and
the cup-shaped sleeve includes a raised portion in a region between adjacent magnet pieces, said raised portion protruding in a radial direction toward an outer peripheral surface of the cup-shaped sleeve beyond the outer peripheral surface outside of the region between adjacent magnet pieces.

3. A linear drive devices comprising:
a cylinder;
a piston reciprocating in said cylinder;
a linear motor provided outside said cylinder and reciprocating said piston;
a cup-shaped sleeve made of a resin, coupled to said piston and functioning as a movable element of said linear motor; and
a permanent magnet provided along an inner peripheral surface on an open end side of said cup-shaped sleeve and reciprocated by a magnetic field generated by said linear motor, said permanent magnet including a surface that is surface-treated with nickel plating or aluminum plating so that a friction coefficient is reduced.

4. A linear drive device, comprising:
a cylinder;
a piston reciprocating in said cylinder;

a linear motor provided outside said cylinder and reciprocating said piston;

a cup-shaped sleeve made of a resin, coupled to said piston and functioning as a movable element of said linear motor, the cup-shaped sleeve including a transition portion between a wall portion of the cup-shaped sleeve and an end portion opposite an open end side of the cup-shaped sleeve;

a permanent magnet molded integrally with an inner peripheral surface on the open end side of said cup-shaped sleeve and reciprocated by a magnetic field generated by said linear motor; and a ring member provided at an inner peripheral surface of said cup-shaped sleeve, covering an inner peripheral surface of said permanent magnet and extending to the transition portion.

5. The linear drive device according to claim 4, wherein said ring member has its thickness substantially constant in an axial direction.

6. The linear drive device according to claim 4, wherein said ring member has a first thickness in an axial direction in a region covering the inner peripheral surface of the permanent magnet, and a second thickness in the axial direction greater than the first thickness in a region extending from an edge of the permanent magnet to the transition portion.

7. The linear drive device according to claim 2, wherein the cup-shaped sleeve includes a slit on a rim portion of the cup-shaped sleeve, between adjacent magnet pieces.

8. The linear drive device according to claim 3, wherein the surface is surface-treated with nickel plating.

9. The linear drive device according to claim 3, wherein the surface is surface-treated with aluminum plating.

10. The linear drive device according to claim 1, wherein the ring-shaped member has its inner peripheral surface larger in diameter than the inner peripheral surface of the permanent magnet.

* * * * *